(12) United States Patent
Dodds et al.

(10) Patent No.: US 10,479,033 B2
(45) Date of Patent: Nov. 19, 2019

(54) WINDABLE BODY, APPARATUS AND METHOD FOR ITS PRODUCTION

(71) Applicant: GE Oil & Gas UK Limited, Bristol (GB)

(72) Inventors: Neville Dodds, Gateshead (GB); Majeed Al-Zubaidy, Warrington (GB)

(73) Assignee: GE Oil & Gas UK Limited, Bristol (GB)

( * ) Notice: Subject to any disclaimer, the term of this patent is extended or adjusted under 35 U.S.C. 154(b) by 399 days.

(21) Appl. No.: 14/896,510

(22) PCT Filed: May 12, 2014

(86) PCT No.: PCT/GB2014/051438
§ 371 (c)(1),
(2) Date: Dec. 7, 2015

(87) PCT Pub. No.: WO2014/199122
PCT Pub. Date: Dec. 18, 2014

(65) Prior Publication Data
US 2016/0107401 A1    Apr. 21, 2016

(30) Foreign Application Priority Data
Jun. 12, 2013  (GB) ..................... 1310485

(51) Int. Cl.
*B29C 70/56* (2006.01)
*B29C 70/52* (2006.01)
*F16L 11/08* (2006.01)
*B29C 53/58* (2006.01)
*B29C 53/12* (2006.01)
(Continued)

(52) U.S. Cl.
CPC ............ *B29C 70/527* (2013.01); *B29C 53/12* (2013.01); *B29C 53/58* (2013.01); *B65H 81/00* (2013.01); *F16L 11/083* (2013.01); *F16L 11/16* (2013.01); *B29K 2105/0058* (2013.01);
(Continued)

(58) Field of Classification Search
CPC .............................. B29C 70/527; B29C 53/58
See application file for complete search history.

(56) References Cited

U.S. PATENT DOCUMENTS 3,391,422 A     7/1968  Boggs
3,728,189 A *   4/1973  Hannes et al. .......... B29C 53/12
                                                          156/143
(Continued)

FOREIGN PATENT DOCUMENTS

CN    2839780     11/2006
EP    2436502     4/2012
(Continued)

OTHER PUBLICATIONS

Search Report for Application No. GB 1310485.6 dated Dec. 5, 2013.
(Continued)

*Primary Examiner* — Galen H Hauth
(74) *Attorney, Agent, or Firm* — Knobbe Martens Olson and Bear, LLP

(57) ABSTRACT

A method and an apparatus of manufacturing flexible pipe body (100) is disclosed. The method includes the step of winding at least one composite body having a substantially helical innate shape around an underlining pipe layer.

5 Claims, 10 Drawing Sheets

(51) Int. Cl.
*F16L 11/16* (2006.01)
*B65H 81/00* (2006.01)
*B29K 105/00* (2006.01)
*B29K 105/10* (2006.01)
*B29K 307/04* (2006.01)
*B29L 23/00* (2006.01)

(52) U.S. Cl.
CPC .... *B29K 2105/103* (2013.01); *B29K 2307/04* (2013.01); *B29L 2023/005* (2013.01)

(56) References Cited

U.S. PATENT DOCUMENTS

| | | | |
|---|---|---|---|
| 3,873,399 A | | 3/1975 | Brandt et al. |
| 4,892,600 A | * | 1/1990 | Beever ................. B29C 70/521 |
| | | | 156/166 |
| 5,064,491 A | * | 11/1991 | Huvey ................... B29C 53/12 |
| | | | 156/173 |
| 5,261,462 A | * | 11/1993 | Wolfe ................... F16L 11/088 |
| | | | 138/129 |
| 5,702,373 A | * | 12/1997 | Samson ............... A61M 25/005 |
| | | | 604/526 |
| 6,620,471 B1 | | 9/2003 | Do |
| 6,804,942 B2 | | 10/2004 | Bryant |
| 2002/0056508 A1 | * | 5/2002 | Brandstrom .......... B29C 70/525 |
| | | | 156/180 |
| 2010/0084035 A1 | * | 4/2010 | Binet .................... F16L 11/083 |
| | | | 138/104 |
| 2012/0222770 A1 | * | 9/2012 | Kristiansen ............. F16L 11/08 |
| | | | 138/103 |
| 2013/0105026 A1 | * | 5/2013 | Biaggi .................. F16L 11/115 |
| | | | 138/121 |

FOREIGN PATENT DOCUMENTS

| | | |
|---|---|---|
| FR | 2312356 | 12/1976 |
| GB | 1443225 | 7/1976 |
| GB | 2041152 | 9/1980 |
| GB | 2056615 | 3/1981 |
| WO | WO 2008/116560 | 10/2008 |
| WO | WO-2011073688 A1 * | 6/2011 ............ F16L 11/081 |

OTHER PUBLICATIONS

International Search Report and Written Opinion for International App No. PCT/GB2014/051438 dated Jul. 31, 2014.
International Preliminary Report on Patentability for PCT/GB2014/051438 dated Dec. 15, 2015.
Chinese Search Report Translation for Application No. 201480033551.6 dated Jan. 28, 2019.

\* cited by examiner

WINDABLE BODY, APPARATUS AND METHOD FOR ITS PRODUCTION

The present invention relates to a method and apparatus for manufacturing flexible pipes and for providing a helically shaped composite body. In particular, but not exclusively, the present invention relates to a method of using a body which, in an innate state, has a helical shape that can be wound around an underlying layer to create an armour layer of a flexible pipe.

Traditionally, flexible pipe has been utilised to transport production fluids, such as oil and/or gas and/or water from one location to another. Flexible pipe has been found to be useful in connecting a subsea location to a sea-level location. Flexible pipe has generally been formed as an assembly of flexible pipe body and one or more end fittings. The pipe body is conventionally formed as a combination of layered materials that form a pressure-containing conduit. The pipe structure allows large deflections in use without causing bending stresses that impair the pipe's functionality over its lifetime. The pipe body is generally built up as a combined structure including tubular metallic and polymer layers which are typically unbonded to one another.

Such unbonded flexible pipes have been used for deep water (less than 3300 feet (1005.84 metres)) and ultra-deep water (greater than 3300 feet (1005.84 metres)) developments. Of course, flexible pipe may also be used for shallow water applications (for example, less than around 500 metres depth) or even for onshore (overland) applications.

Often, conventional unbonded flexible pipe includes metallic reinforcement "wires" arranged around an underlying layer such as a thermoplastic liner to carry hoop and axial loads experienced by the flexible pipe. Typically these wires, which may have a block-like cross-section or an interlocking cross-section, have been formed from a metal material such as steel, however, it has been suggested that composite structures could be utilised. However, composite structures behave almost purely elastically and cannot be plastically deformed during manufacture so that shapes suitable for building an unbonded flexible pipe cannot easily be manufactured. In fact, conventionally, such composite structures must most often be molded in situ.

Certain solutions have created such structures by stacking pre-consolidated thin tapes together and bonding them into a "wire" arrangement. These are then wound as composite wires to form a flexible pipe layer. Winding is carried out as normal armour wires would be wound in a conventional technique. All of these suggested solutions though present their own disadvantages. For example speed of production has been an inhibiting factor as well as there still being residual stresses remaining in an armour layer that can ultimately lead to pipe failure.

It is an aim of the present invention to at least partly mitigate the above-mentioned problems.

It is an aim of certain embodiments of the present invention to provide a pultrusion process which can be utilised to manufacture composite bodies having an innate helical shape.

It is an aim of certain embodiments of the present invention to provide composite wires that can be helically wound in a flexible pipe whereby the wires can be manufactured via a production process which is quicker than conventional techniques.

It is an aim of certain embodiments of the present invention to provide a method and apparatus for providing a helical composite body using a pultrusion process during which parameters of the pultrusion process are varied so that the end product, which is a cured composite body, is provided with a helical shape.

It is an aim of certain embodiments of the present invention to provide flexible pipe body in which one or more or all wires in an armour layer are provided by a composite body which has an innate helical shape.

It is an aim of certain embodiments of the present invention to make use of helical shaped composite bodies for the purpose of manufacturing one or more layers of a flexible pipe.

According to a first aspect of the present invention there is provided a method of manufacturing flexible pipe body, comprising the steps of winding at least one composite body having a substantially helical innate shape around an underlying pipe layer.

Aptly the method further comprises winding a plurality of helical composite bodies simultaneously around the underlying layer to provide an armour layer.

Aptly the method further comprises providing a pressure armour layer or a tensile armour layer by winding the plurality of helical composite bodies.

Aptly the method further comprises winding helical composite bodies that have a cross-sectional profile that interlocks with adjacent windings of the armour layer as the armour layer is formed.

Aptly the method further comprises winding helical composite bodies that have sufficient axial stiffness along a length of the body to maintain gaps between adjacent windings in the armour layer below a predetermined maximum gap distance.

Aptly the method further comprises winding a hollow composite body.

Aptly the method further comprises winding at least one hollow composite body having an aerogel material at least partially filling an internal region.

According to a second aspect of the present invention there is provided a method of providing a helical composite body comprising the steps of providing a resin impregnated fibre by pulling at least one fibre element through a resin bath and providing a cured composite body by curing the resin impregnated fibre in a linear die; whereby the cured composite body is provided in a helical shape by determining at least one parameter associated with the impregnated fibre in the die.

Aptly the method further comprises determining said at least one parameter by varying at least one operating parameter associated with the step of curing the impregnated fibre.

Aptly the method further comprises varying said at least one operating parameter by offsetting an effective location of a pulling force on the fibre element from a straight through path associated with the die.

Aptly the method further comprises varying said at least one operating parameter by selectively rotating a puller unit pulling the cured composite body with respect to the die.

Aptly the method further comprises varying said at least one operating parameter by selecting a changing temperature profile in at least one region of the die.

Aptly the method further comprises providing a differential temperature distribution in at least one region of the die.

Aptly the method further comprises determining said at least one parameter by varying an axial and/or torsional stiffness along a length and/or width of the impregnated fibre.

Aptly the method further comprises providing at least one transverse fibre and/or transverse fabric with the impregnated fibre.

Aptly the method further comprises an in-line process.

Aptly the method comprises a continuous production process.

Aptly the method comprises a pultrusion method.

Aptly the method provides a cured composite body is an elongate body having a substantially common cross section along a length of the composite body.

According to a third aspect of the present invention there is provided apparatus for providing a helical composite body, comprising a linear die for curing a resin impregnated fibre provided from a resin bath; and a puller unit that pulls the cured composite body from the linear die; wherein an effective location of a pulling force provided by the puller unit is offset from a straight through path associated with a die and/or the puller unit and die are selectively rotatable with respect to each other to provide a composite body having an innate helical shape.

Aptly the puller unit is a clamp and pull unit having a selectable location with respect to an exit orifice of the die.

Aptly the puller unit is rotatable about longitudinal puller unit axis.

Aptly the die comprises at least two spaced apart heater elements to provide at least two temperature controlled zones in the die.

Aptly the apparatus further comprises a resin bath comprising a source of resin.

Aptly the apparatus further comprises at least one tension/guide plate between the resin bath and the die.

Aptly the apparatus further comprises at least one creel element comprising unidirectional or multidirectional reinforcements.

Aptly the apparatus further comprises at least one reinforcement element comprising a fibre mat or fibre roving or carbon fibre or non-woven veil.

According to a fourth aspect of the present invention there is provided apparatus constructed and arranged substantially as hereinbefore described with reference to the accompanying drawings.

According to a fifth aspect of the present invention there is provided a method substantially as hereinbefore described with reference to the accompanying drawings.

Certain embodiments of the present invention may provide a method and apparatus for providing a helical composite body. By engendering a helical shape in a composite body, that body can be wound helically around an underlying structure, and as long as the pitch of winding substantially matches the pitch of the innate state of the composite body, stresses and strains in the winding and a layer produced by the multiple such windings are almost entirely or are entirely eliminated.

Certain embodiments of the present invention may provide a method and apparatus for manufacturing a helical body via a pultrusion process. As a result, a rate of manufacture of a composite body usable to form a flexible pipe winding is greatly increased relative to prior known techniques.

Certain embodiments of the present invention may be utilised to form an unbonded flexible pipe having flexible pipe body with reduced specific weight. Individual composite reinforcement elements can be introduced to replace the equivalent conventional functional metallic elements to form a fully or partial (hybrid) composite unbonded flexible pipe.

Certain embodiments of the present invention may provide a method of providing a helical composite body having a cross-section which can be selected as desired according to use. For example, a block-shaped cross-section or a substantially Z-shaped cross-section or a C-shaped cross-section can be formed in the helical composite body during manufacture.

Certain embodiments of the present invention may mold in a bend and twist to an otherwise plane section pultrusion to help minimise the applied bending strain and twist generated when applying the body to a flexible pipe (such as a tensile or pressure armour winding). This obviates the disadvantage of using straight pultrusions for such purposes which have the disadvantage of utilising part of an inherent strength of the pultrudate in bending or twisting before being loaded as part of the pipe structure. Use of straight pultrusions results in lower efficiency and hence failing at a lower overall applied load relative to solutions offered by the present invention.

Embodiments of the present invention will now be described hereinafter, by way of example only, with reference to the accompanying drawings in which.

In the drawings like reference numerals refer to like parts.

Figure 1:
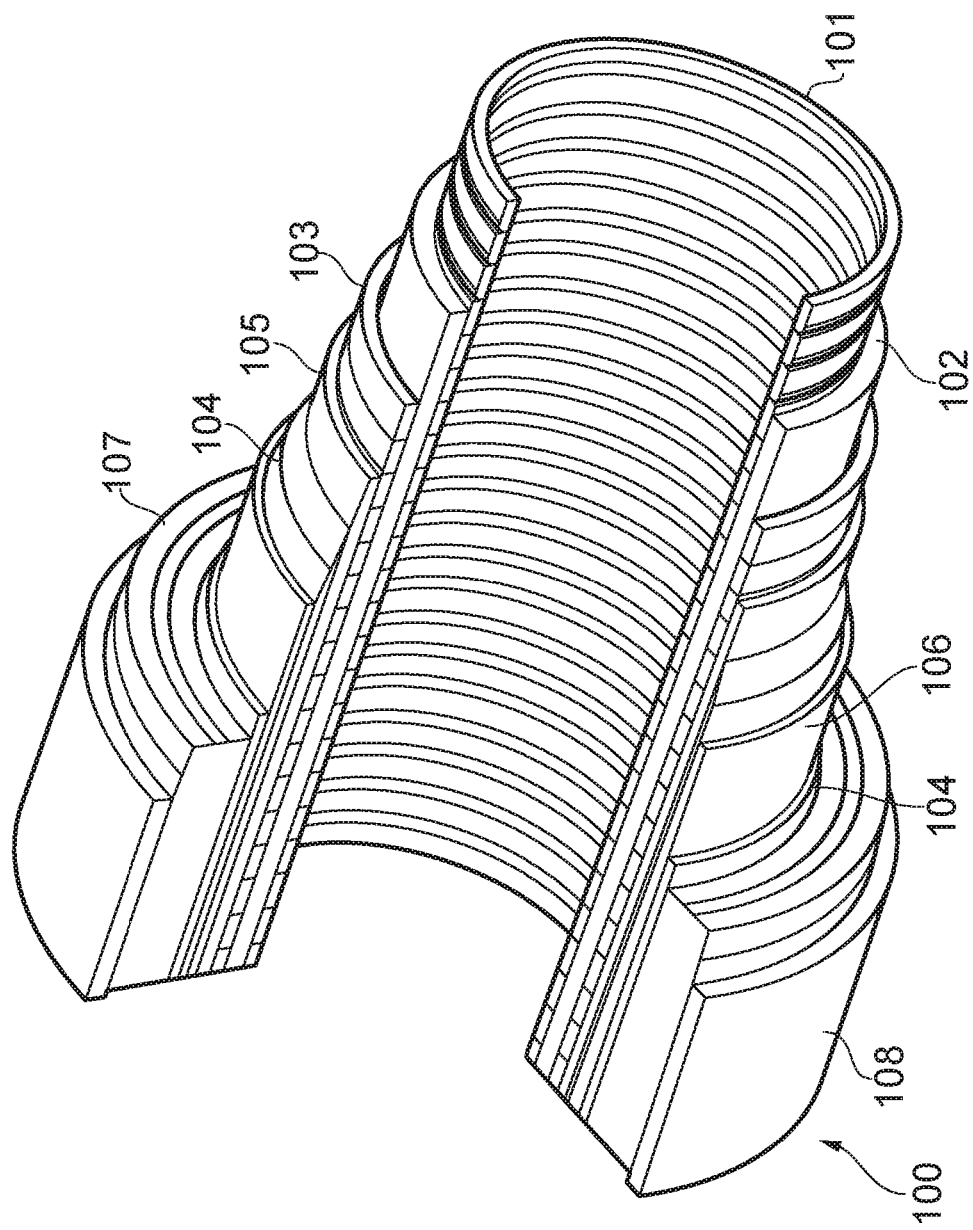
FIG. 1 illustrates flexible pipe body.

Throughout this description, reference will be made to a flexible pipe. It will be understood that a flexible pipe is an assembly of a portion of pipe body and one or more end fittings in each of which a respective end of the pipe body is terminated. FIG. 1 illustrates how a portion of pipe body 100 (referred to as a segment) is formed from a combination of layered materials that form a pressure-containing conduit. Although a number of particular layers are illustrated in FIG. 1, it is to be understood that the present invention is broadly applicable to coaxial pipe body structures including one or more layers manufactured from a variety of possible materials. For example, the pipe body may be formed from metallic layers, composite layers, or a combination of different materials. It is to be further noted that the layer thicknesses are shown for illustrative purposes only.

As illustrated in FIG. 1, pipe body includes an optional innermost carcass layer 101. The carcass provides an interlocked construction that can be used as the innermost layer to prevent, totally or partially, collapse of an internal pressure sheath 102 due to pipe decompression, external pressure, and/or tensile armour pressure and mechanical crushing loads. The carcass layer is often a metallic layer, formed from carbon steel, for example. The carcass layer could also be formed from composite, polymer, or other material, or a combination of materials. It will be appreciated that certain embodiments of the present invention are applicable to 'smooth bore' operations (i.e. without a carcass) as well as such 'rough bore' applications (with a carcass).

The internal pressure sheath 102 acts as a fluid retaining layer and comprises a polymer layer that ensures internal fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass the internal pressure sheath may be referred to as a liner.

An optional pressure armour layer 103 is a structural layer with elements having a lay angle close to 90° that increases the resistance of the flexible pipe to internal and external pressure and mechanical crushing loads. The layer also structurally supports the internal pressure sheath, and is typically an interlocked construction of wires wound with a lay angle close to 90°. The pressure armour layer is often a metallic layer, formed from carbon steel, for example. The pressure armour layer could also be formed from composite, polymer, or other material, or a combination of materials.

The flexible pipe body also includes an optional first tensile armour layer 105 and optional second tensile armour layer 106. Each tensile armour layer is used to sustain tensile loads and internal pressure. The tensile armour layer is often formed from a plurality of metallic wires (to impart strength to the layer) that are located over an inner layer and are helically wound along the length of the pipe at a lay angle typically between about 10° to 55°. The tensile armour layers are often counter-wound in pairs. The tensile armour layers are often metallic layers, formed from carbon steel, for example. The tensile armour layers could also be formed from composite, polymer, or other material, or a combination of materials.

The flexible pipe body shown also includes optional layers 104 of tape which each help contain underlying layers and may act as a sacrificial wear layer to help prevent abrasion between adjacent layers.

The flexible pipe body also typically includes optional layers of insulation 107 and an outer sheath 108, which comprises a polymer layer used to help protect the pipe against penetration of seawater and other external environments, corrosion, abrasion and mechanical damage.

Each flexible pipe thus comprises at least one portion or segment of pipe body 100 together with an end fitting located at at least one end of the flexible pipe. An end fitting provides a mechanical device which forms the transition between the flexible pipe body and a connector. The different pipe layers as shown, for example, in FIG. 1, are terminated in the end fitting in such a way as to transfer the load between the flexible pipe and the connector.

Figure 2:
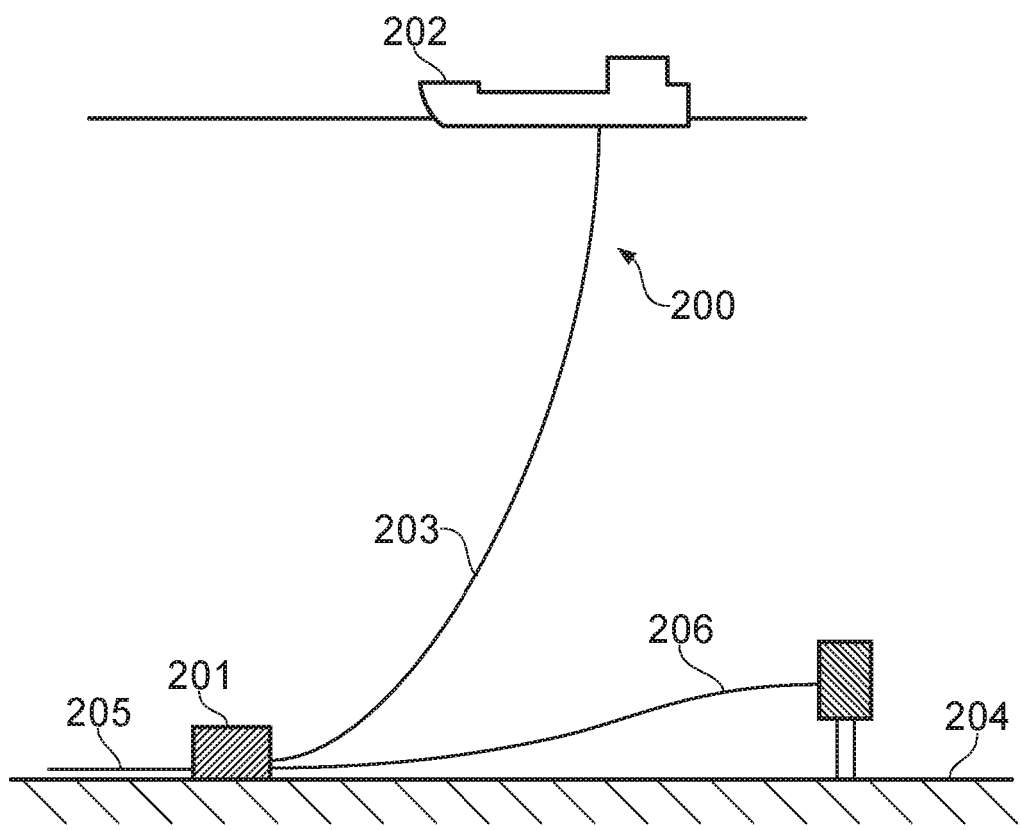
FIG. 2 illustrates use of a flexible pipe.

FIG. 2 illustrates a riser assembly 200 suitable for transporting production fluid such as oil and/or gas and/or water from a subsea location 201 to a floating facility 202. For example, in FIG. 2 the subsea location 201 includes an end of a subsea flow line. The flexible flow line 205 comprises a flexible pipe, wholly or in part, resting on the sea floor 204 or buried below the sea floor and used in a static application. The floating facility may be provided by a platform and/or buoy or, as illustrated in FIG. 2, a ship. The riser assembly 200 is provided as a flexible riser, that is to say a flexible pipe 203 connecting the ship to the sea floor installation. The flexible pipe may be a single segment or multiple segments of flexible pipe body with end fittings connected end-to-end.

It will be appreciated that there are different types of riser, as is well-known by those skilled in the art. Certain embodiments of the present invention may be used with any type of riser, such as a freely suspended riser (free, catenary riser), a riser restrained to some extent (buoys, chains) or totally restrained riser. Certain other embodiments of the present invention can be used as flowlines or jumpers or the like.

Figure 3:
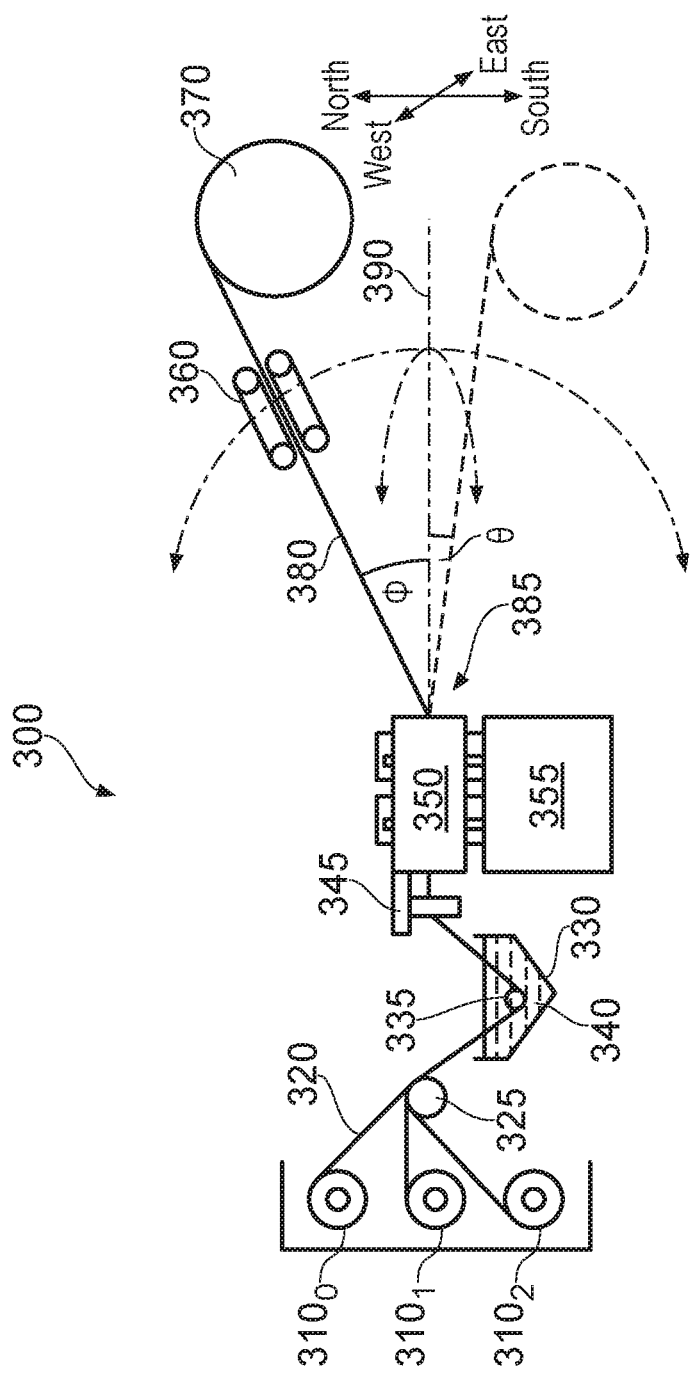
FIG. 3 illustrates a schematic illustration of a pultrusion process.

FIG. 3 helps illustrate how a continuous pultrusion method can be utilised to produce continuous lengths of fibre reinforced body. Such composite body may then be used as a winding in a flexible pipe or for other purposes. The manufacturing system 300 illustrated includes six fibre-reinforcement creels $310_{0,1,2}$ (three shown) which store reinforcing fibres in a wound state. Other numbers of creels and wires could of course be utilised. These reinforcing fibres 320 are pulled from the creels and are aligned in a desired configuration by a support 325. Additional unidirectional and/or multi-directional reinforcements may optionally be organised at this position prior to the fibres and any additional reinforcements entering a resin bath 330. The bath 330 is a container holding a store of curable resin in liquid form. Aptly the resin is from the families of epoxies, vinyl-esters, polyesters or polyurethanes or the like. A guide 335 in the resin bath is optionally used to help keep the reinforcement fibres in an aligned and desired orientation. Fibre roving is dispensed from centre-pull packages sitting in book shelf type racks. Fibre mats, supplied in large rolls are pulled from an outside tangent from simple spindles. Optionally roving may be dispensed tangentially from spindles where elimination of roving twist in an end product is desired. Aptly other reinforcements and surfacing materials such as carbon fibre and non-woven veils are dispensed tangentially.

The fibre elements including the reinforcement fibres 320 and any other reinforcement element is impregnated with the resin matrix 340 in the resin bath 330. An alignment module 345 includes tension and guide plates to help precisely form the impregnated reinforcement immediately prior to entering a heated die 350. Aptly the die is a steel die machined to the final dimensions of the parts desired. The temperature profile within one or more regions inside the die is controlled by a temperature controller 355. This is illustrated in more detail in FIG. 4.

FIG. 3 helps illustrate how a puller unit 360 is used to pull the reinforced fibres and cured product from the heated die. In the example shown the puller unit 360 exerts a pulling force on the part leaving the die. This pulls the material from the creels through the resin bath and the guide area 345 into the heated die 350 and ultimately through to a winding station 370 or cut-off station (not shown) which automatically cuts the part to a desired manufactured length.

FIG. 3 helps illustrate how the puller unit 360 may be offset in a north-south and/or east-west direction to pull a pultrudate 380 from an exit orifice 385 at the exit end of the die 350. An effective location of a pulling force can thus be offset with respect to a straight through path illustrated by the line labelled 390 in FIG. 3. The puller unit can be aligned offset from this straight through path in the north-south direction by an angle $\phi$ and/or in the east-west direction with respect to the straight through path by an angle $\ominus$. It will be appreciated that the puller unit could be offset in a combination of east west and north south orientations. It will be appreciated that the winding unit 370 is optionally offset a corresponding amount to match that offset of the puller unit. Aptly the puller unit and winding unit move together. FIG. 3 illustrates two of the many possible orientations with a first position shown in a solid line and a further position illustrated in a dotted line.

Figure 4:
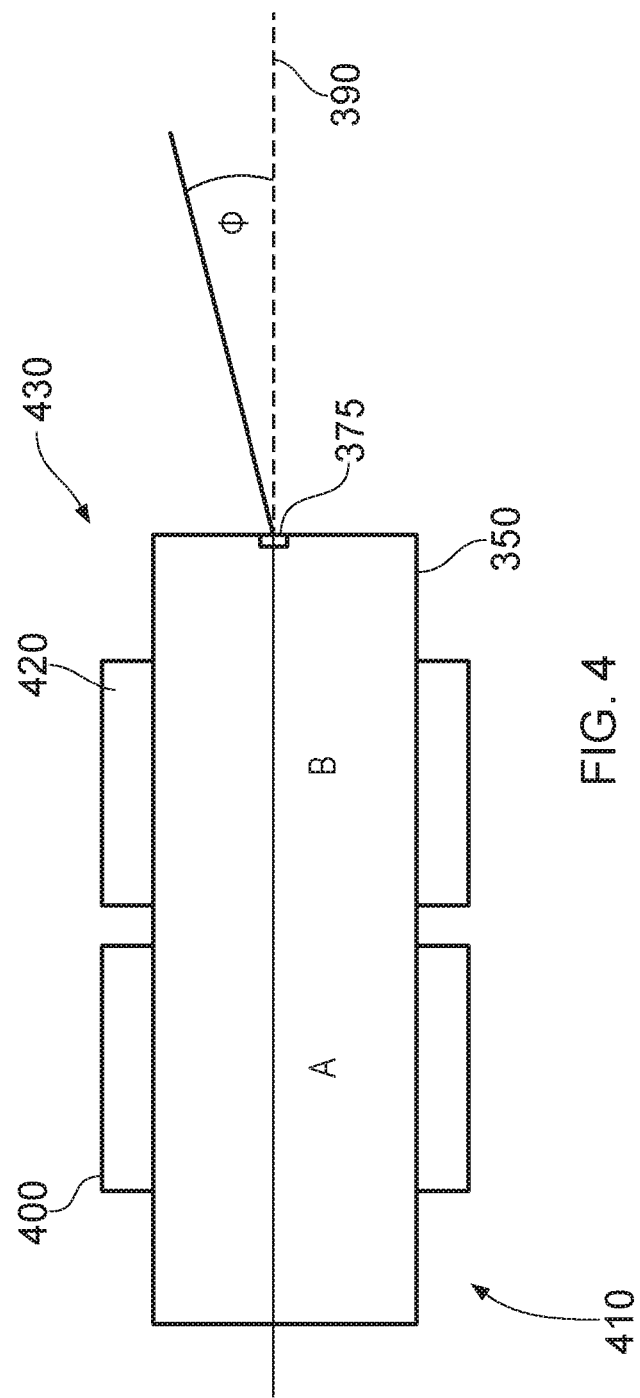
FIG. 4 illustrates two heating zones in a linear die.

FIG. 4 helps illustrate the die 350 and the straight through path 390 associated with movement of the cured reinforced fibres along a direct path associated with the die 350. A first temperature generating element 400 is located around the die towards a first end 410 of the die. A further temperature generating element 420 is located around the die towards a further downstream end 430 of the die 410. A heater can be used to generate the heat and this can be an induction heater or resistance based heater or the like. The controller 355 can selectively and independently control the temperatures in a first zone A and a further zone B within the die by determining the amount of heat generated by each heating element 400, 420. It will be appreciated that one, two, three or more heating elements may be located about or inside the die so that a desired temperature profile inside the die can be finely tuned and controlled. Aptly at least two zones (although more than two can be used) within the die can have different temperatures set and these can be continuously maintained or continuously varied. Aptly the heating zones extend circumferentially around the whole outer circumference of the die. Aptly the heating elements are located on just a top and bottom part of the die. This enables a temperature change to be selectable along the length of the die and radially across the die at any point along the length. A temperature profile along a length of the die and a temperature profile across the body of the die at any point along its length can optionally be set as desired. Aptly the heating elements are located spaced apart circumferentially about the die. In the example illustrated in FIG. 4 T1 is the temperature established throughout zone A and temperature T2 is the temperature established throughout zone B. It will be appreciated that for any incoming resin impregnated and reinforced element the temperatures generated in the zones and indeed in upper and lower regions of the die may be selected so as to produce a non-straight pultruded product exiting the exit orifice 385. Certain embodiments of the present invention make use of a pultrudate 380 exiting the exit orifice 385 having an innate helical shape generated by providing an offset and twist to the resin impregnated fibres during curing. Optionally the offset and twist are generated by offsetting and twisting the puller unit 360 with respect to the die 350. This can be achieved by rotating and moving the die or rotating and moving the puller unit or a combination of the two.

Figure 5A:
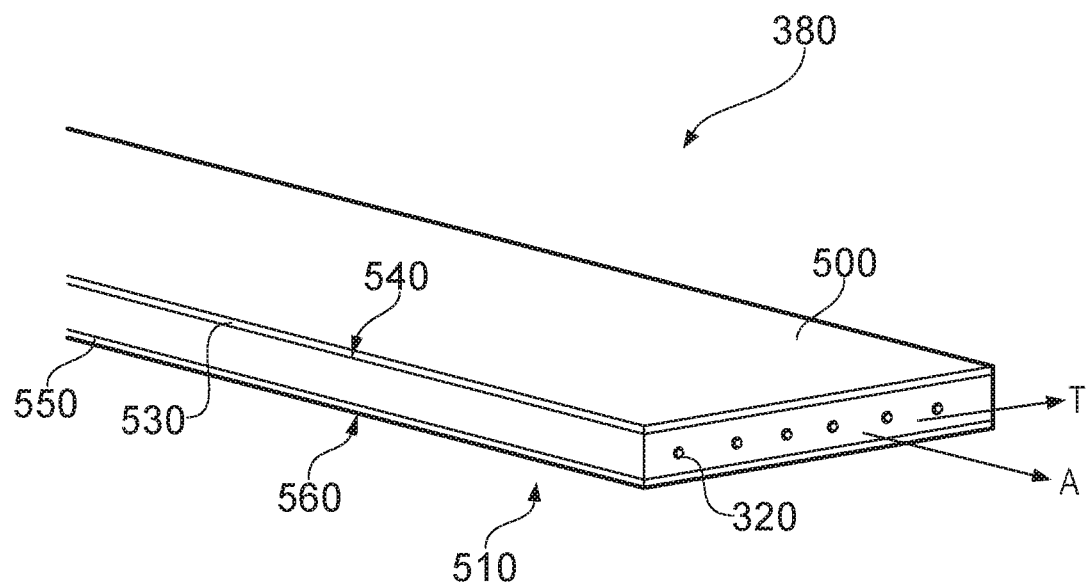
FIG. 5 illustrates creation of a bend in a composite body.
Figure 5B:
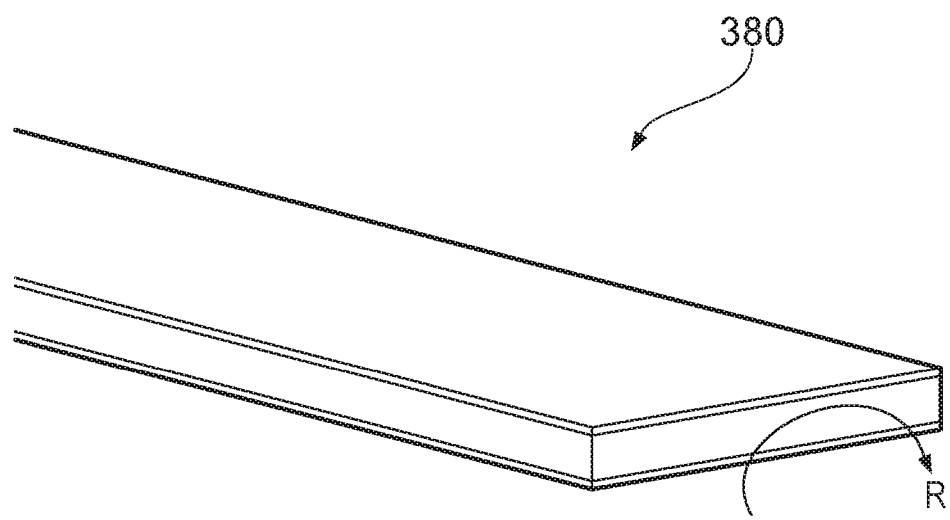

FIGS. 5A and 5B illustrate how torsion can be produced in the curing pultrudate so that the puller unit does not need to be offset from the exit orifice or that the puller unit does not need to be as offset from the straight through path as it would be if the cured pultrudate was formed with a generally straight shape. As illustrated in FIG. 5A the pultrudate 380 is a generally elongate body having an upper surface 500 spaced apart from a lower surface 510. The elongate body is associated with an axial direction illustrated by arrow A in FIG. 5A as well as a transverse axis illustrated by arrow T in FIG. 5. As illustrated in FIG. 5A unidirectional wires 320 are spaced apart within the centre of the body of the pultrudate and these extend longitudinally along the length of the pultrudate 380. The density of fibres in regions of the pultrudate may be constant or non-constant. The pultrudate 380 illustrated in FIG. 5A includes an upper layer 530 of transverse reinforcement. That is to say material which extends in the transverse direction formed as a layer which is applied to an upper surface 540 of a core region of the pultrudate. A lower layer 550 of transverse reinforcement 550 is applied to a lower surface 560 of the core region of the pultrudate. At least one parameter such as thickness or material makeup of the upper and lower reinforcement layers 530, 550 may be different. In this sense the upper and lower reinforcement layers are asymmetric layers of transverse reinforcement applied on surfaces of the core of the pultrudate body. For example a thickness of the asymmetric layers may be different. Because of the asymmetric nature in terms of parameters associated with the reinforcement layers the asymmetric transverse layers will shrink less in the transverse direction, as this is fibre dominated, than the unidirectional layer in the transverse direction. This produces torsion in the cured pultrudate. The torsion effect is illustrated by the arrow R in FIG. 5B. Thus by selecting material and/or thicknesses and/or alignment of reinforcement on a pultrudate or by selecting how an upper or lower surface of the pultrudate is treated in the die (or a combination of these) it is possible to generate in the cured pultrudate a natural tendency to curl. This curling together with the twisting motion induced by rotating the puller unit and/or die can be utilised to generate an innate helical structure in an end product pultrudate. The curling motion can be used to enhance a curl generated by offsetting a pulling unit with respect to a die or can be used as an alternative so that the pulling unit does not need to be offset from a straight through path through the die. Thus inducing a linear curvature can be combined with a torsional twist to form a helix.

Adding transverse fibres and/or surface scrim to the pultrudate has at least two positive effects. Firstly the largely unidirectional pultrudate is reinforced in the transverse direction which helps prevent cracks forming before the materials have fully cured or while the material is stored on a reel. Furthermore inclusion of such reinforcement can be used to induce a curvature in the finished pultrudate.

By controlling parameters such as curing rate or curing materials or thicknesses or differential pressures or differential temperatures or different combinations of materials, pultrusions with a constant curvature and constant torsion i.e. which form a helical shape under no external loading, can be provided according to certain aspects of the present invention. Changing parameters during manufacture can of course form a pultrudate which has a pitch and radius that varies along its length. This is advantageous for some uses whilst generating a pultrudate that has a constant pitch and radius is advantageous for other uses (for example when used as a winding in flexible pipe body). Aptly the pultrusion has a plane section. Aptly the cross-section of a pultrudate, as illustrated in FIG. 5 is a generally rectangular shaped body which optionally has rounded corners constructed from mainly unidirectional fibres of one fibre type. Different fibre types may selectively be used in selected areas of the cross-section of the pultrudate to control performance of the pultrudate and to control formation of a desired innate shape in the pultrudate. As illustrated in FIG. 5 the pultrudate may be provided with unidirectional asymmetrical distributions of dissimilar fibres or woven tapes or fabrics. Aptly differential temperatures are applied across the profile of the pultrudate in the range $T \pm \Delta T$ where T is the characteristic cure temperature for the composite system under consideration and $\Delta T$ is 50° C. Aptly $\Delta T$ is 60° C. Aptly $\Delta T$ is 40° C.

The tension across the fibre feed is controlled in the range of about around 0 to 200N per 1 k tow. Traction offset is defined by an angle between the axial die direction and the diverted path. Aptly traction offset is in the range of about around 0 to 50°. Aptly traction offset is in the range of about around 20-40°. Aptly traction offset is in the range of about around 0-25°. Lower angles of offset help reduce a risk of fibre damage.

The rotational traction offset is also a parameter which can be controlled to create a pultrudate 380 having an innate helical shape. Aptly the rotational traction offset is in the range of 0-180°. Aptly the rotational traction offset is in the range 0-90°. Aptly the rotational traction offset is in the range 0-45°.

Application of each parameter alone or in tandem will provide pultrudate curvatures in the range about around 5 $m^{-1}$ to 0.1 $m^{-1}$ and torsions in the range 2 $m^{-1}$ to 10 $m^{-1}$ combined with a twist in the range 0 to 1.57π radians/m length generalised, but not limited to, a rectangular plain section.

It will be appreciated that the achieved radius of curvature will vary according to the geometry of the pultrusion and the differential tension, temperature, traction offset and other parameters applied and experienced by the pultrudate in the die and the construction of the pultrusion. Aptly different fibre types can optionally be utilised so that the thermal expansion coefficient will differ across the pultrudate as it is cured. Also woven tapes or fabrics can be applied. Each approach can be used to influence a degree of bowing of the product in a desired direction. Aptly a 4 mm×15 mm rectangular cross-section having a constant curvature of 2.4 m$^{-1}$ i.e. a radius of curvature of 0.42 meters with constant torsion of 3.6 m$^{-1}$ can be provided. Twist of 71 radians per m length can also be provided.

Figure 6:
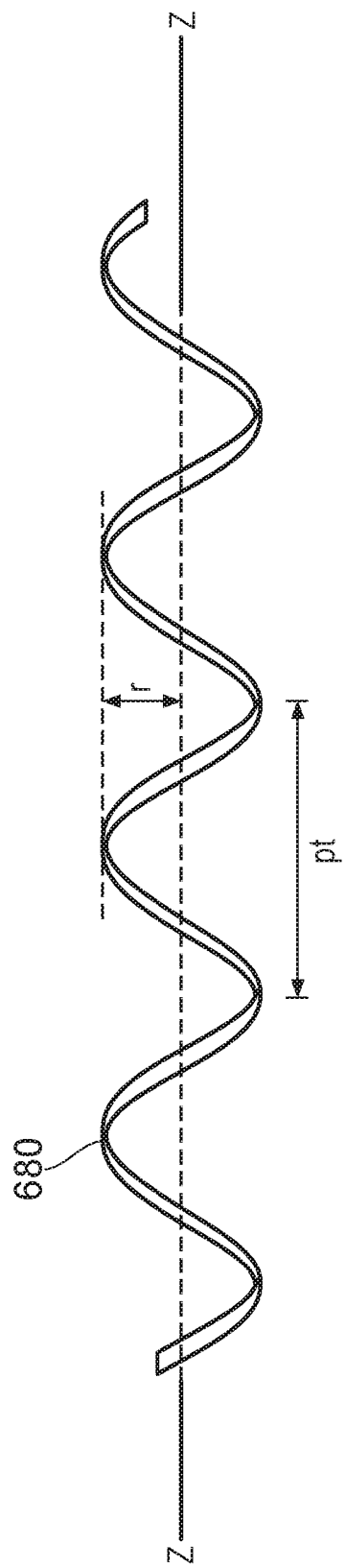
FIG. 6 illustrates a helical composite body.
Figure 7:
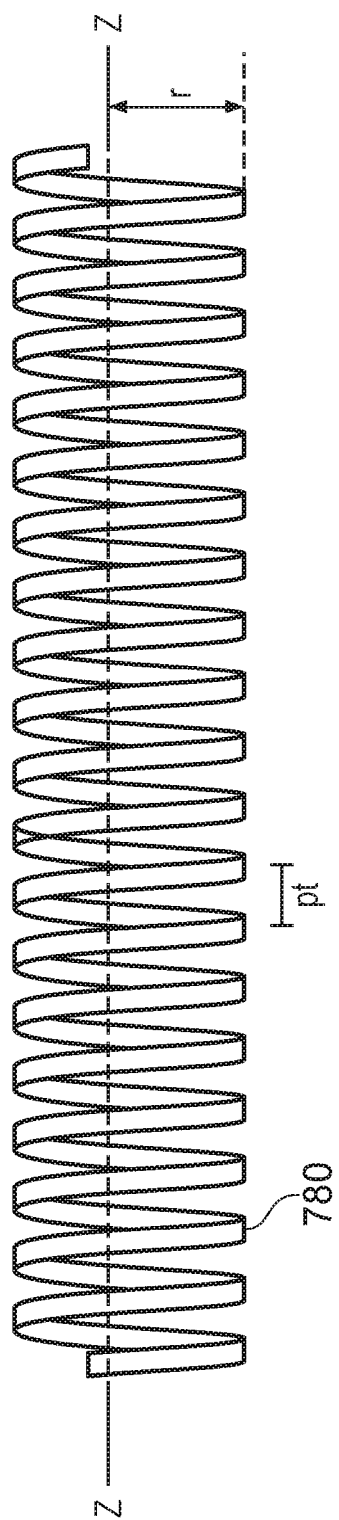
FIG. 7 illustrates a helical composite body having a different pitch to that shown in FIG. 6.

FIG. 6 illustrates a helical pultrudate 680. That is to say FIG. 6 helps illustrate how in an innate state (that is to say a state where no pressure or force is applied to the pultrudate) the pultrudate tends to adopt a naturally helical shape. Helixes of any handedness or chirality can be created according to certain embodiments of the present invention. Aptly the helical shape is the shape of a circular helix having constant band curvature and constant torsion. FIG. 7 illustrates how a pultrudate 780 can be formed to have an innate helical shape which has a smaller pitch to that shown in FIG. 6. The pitch of a helix is the width of one complete helix turned measured parallel to an axis Z associated with the helix. Selection of pitch pt and radius r can be made to maximise the usefulness of the pultrudate for a particular end purpose.

It will be appreciated that because the pitch of the long helix shown in FIG. 6 is relatively long that a composite body of this type would be very suitable for winding as a tensile armour winding in a flexible pipe. The pitch pt can of course be determined during manufacture so as to match exactly or at least substantially a pitch expected in flexible pipe body that is to be manufactured. As a result when such a winding is wound as an armour winding it may be wound without undue stress and strain which would otherwise diminish the strength of the winding.

By contrast the pitch pt of the curved pultrusion illustrated in FIG. 7 is much shorter. Such a pultrusion can aptly be used as a non-interlocking winding for a pressure armour layer. Such a winding can be manufactured by the process described in WO2008/116560, the disclosure of which is incorporated herein by way of reference.

Figure 8:
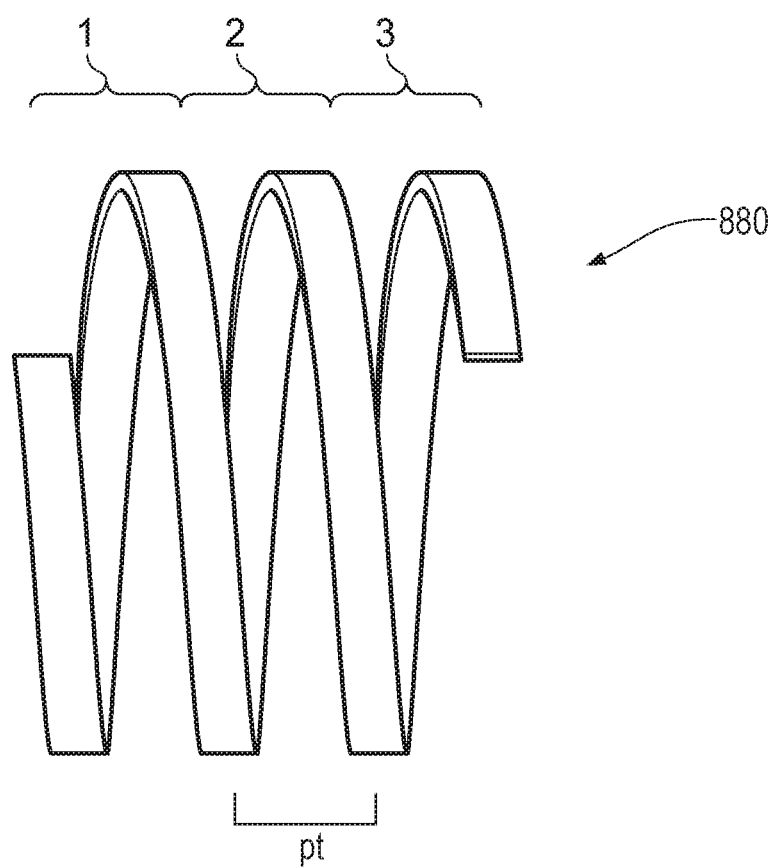
FIG. 8 illustrates a helical composite body.

FIG. 8 illustrates a pultrudate 880 having a short length. The pultrudate illustrated in FIG. 8 consists of only three turns. Whilst such a winding would be of limited use in its application to a flexible pipe it will be appreciated that certain embodiments of the present invention are not restricted to use with flexible pipes. Rather certain embodiments of the present invention relate to the method and apparatus used to manufacture a pultrudate having an innate helical shape. Such helical pultrudates may have many different uses and short sections of the type illustrated in FIG. 8 will be particularly useful in certain circumstances.

Figure 9:
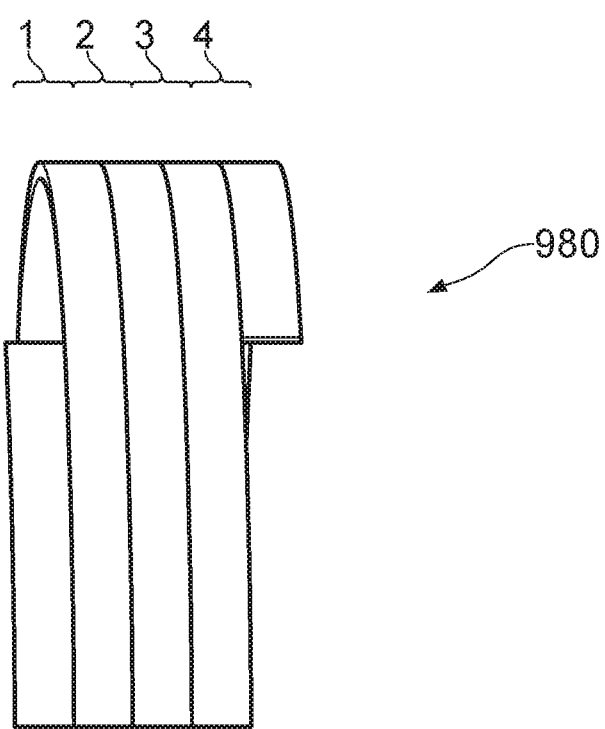
FIG. 9 illustrates a helical composite body having a very close pitch.

FIG. 9 illustrates another short length pultrudate 980. The pultrudate 980 illustrated in FIG. 9 is formed of four turns. It will of course be appreciated that certain embodiments of the present invention are not restricted to the generation of pultrudates having a whole number of turns. The turns of the pultrudate illustrated in FIG. 9 have a much smaller pitch than that illustrated in FIG. 8. In fact the shape is such that adjacent turns almost abut with each other or do in fact abut.

It will however be appreciated that the turnings do not interlock. The windings of this pultrudate have sufficient spring or axial stiffness to keep gaps between adjacent windings closed entirely or almost closed.

Figure 10:
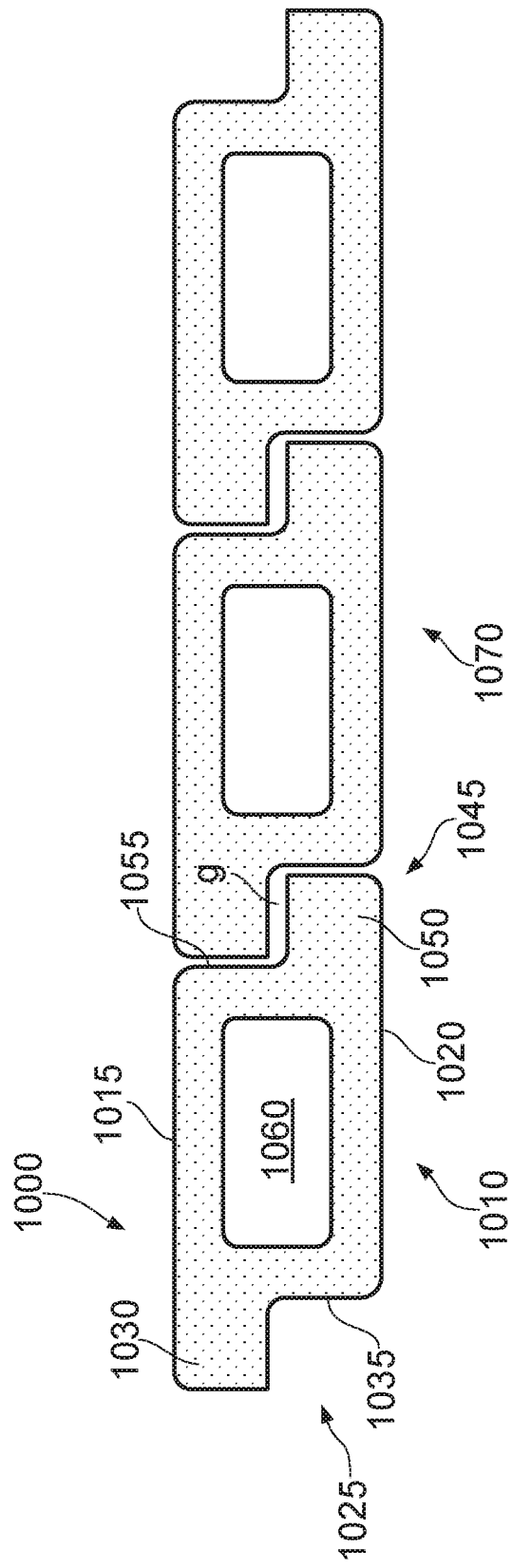
FIG. 10 illustrates winding of a hollow composite body.

FIG. 10 illustrates how certain embodiments of the present invention can be utilised to form a pultrudate 1000 which does not have a generally rectangular cross-section. As illustrated in FIG. 10 which shows three adjacent turns of a helical pultrudate formed to have a small pitch. The turns of this pultrudate, in cross-section, have an interlocking structure so that as a cured composite body exits a manufacturing die a helical structure is created which presents an almost closed outer surface. For example as shown in FIG. 10 a first turn 1010 has a radially outermost surface 1015 and a radially innermost surface 1020. A first end 1025 of the cross-section of the turn has a nose-like protuberance 1030 extending from the radially outermost surface 1015 to the radially innermost surface 1020 via a recessed region 1035 of the cross-section. The remaining end 1045 of the cross-section of a turn likewise has a nose-like protuberance 1050 extending from the radially innermost side 1020 towards radially outermost side 1015 via a recessed region 1055. The composite body is hollow having a central space 1060. Aptly this central space 1060 is full or at least partially full of aerogel material or air or other such insulating material. Materials having other physical properties could of course be utilised as filler material. It will be appreciated that the cross-section of the pultrudate is such that the convex parts of one turn interlock into a concave region an adjacent turn. A gap g between adjacent turns (such as between turns 1010 and adjacent turn 1070) can be kept small. Aptly the gap is less than 5 mm. Aptly the gap is less than 2 mm. Providing a pultrudate that has such an interlocking cross-section and which includes turns which are so close together is useful for the formation of certain types of structure. For example such a winding can be utilised as a direct replacement for the metal reinforcements of conventional unbonded flexible pipe carcass layer and/or pressure armour layer.

Certain embodiments of the present invention thus utilise a pultrusion method which is a continuous production method suitable for the manufacture of elongate plane section profiles. The process allows composite elements to be continuously manufactured in curved helical form and these composite elements can subsequently be stored and then used or used directly to form layers made up of multiple composite wires unbonded to each other (or mechanically interlocked) as required.

Certain embodiments of the present invention utilise an in-feed of a substantially unidirectional fibre and resin to maximise a tensile strength of a curved pultrusion.

Certain embodiments of the present invention utilise a body which has a helical innate shape to wind around an underlying pipe layer. Whilst one example of how such a helical body can be formed has been previously described with respect to FIGS. 3 and 4 it will be appreciated that certain embodiments of the present invention are broadly applicable to making use of helical bodies which have an innate helical shape as windings when forming flexible pipe body. For example, as noted above, WO2008/116560 describes how elongate plastic profiles can be produced having a three-dimensional shape. Certain embodiments of the present invention utilise such structures for the manufacture of flexible pipe body.

Certain embodiments of the present invention may optionally incorporate transverse fibres and fabrics in addition to substantially unidirectional fibres to help influence a stiffness in an axial and torsional sense of a final pipe axis.

No middle steps of composite impregnation and curing prior to pipe manufacture are necessary as in prior art disclosures. Rather the impregnation and curing steps are carried out in-line as part of a manufacturing process and the final cured shape exits the process in a state usable for a pipe structure. This helps avoid the bending and stressing and therefore damage caused in post-applying pre-cured materials in strip or coiled form.

Certain embodiments of the present invention can be utilised as a direct replacement for the metallic reinforcements of otherwise conventional unbonded flexible pipe. This is achieved by using a long helix as a direct replacement of tensile armour windings where multiple wires are formed to fill a layer continuously. Similarly a hoop reinforcement layer may be formed from a closed helix with a single or multiple start where the profile cross-section may be arranged to interlock or to have sufficient spring or axial stiffness (for example, by adding in transverse reinforcement) to keep gaps between windings wholly or at least partially closed.

Such a methodology can aptly be utilised to form a pressure armour layer in a flexible pipe.

Certain embodiments of the present invention use a curved pultrusion technique which can create hollow cross-sections to maximise the second moment of area and provide an efficient collapse resistant layer. The hollow sections may optionally be filled with low thermal conductivity materials such as an aerogel or air or the like to provide a highly insulating layer.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of providing a helical composite body, comprising the steps of:
   providing a resin impregnated fibre by pulling at least one fibre element through a resin bath; and
   providing a cured composite body by curing the resin impregnated fibre in a linear die; whereby
   the cured composite body is provided in a helical shape by varying an axial and/or torsional tension along a length and/or width of the impregnated fibre.

2. The method as claimed in claim 1, further comprising the steps of:
   offsetting an effective location of a pulling force on the fibre element from a straight through path associated with the die.

3. The method as claimed in claim 1, further comprising the steps of:
   selectively rotating a puller unit pulling the cured composite body with respect to the die.

4. The method as claimed in claim 1, further comprising the steps of:
   varying at least one operating parameter associated with a step of curing the impregnated fibre by selecting a changing temperature profile in at least one region of the die.

5. The method as claimed in claim 1, further comprising the steps of:
   providing at least one transverse fibre and/or transverse fabric with the impregnated fibre.

* * * * *